United States Patent

[11] 3,568,746

[72] Inventors Charles C. Faroni
Summit, N.J.;
John S. Humphrey, Jr., Johnson City, N.Y.
[21] Appl. No. 618,263
[22] Filed Feb. 6, 1967
[45] Patented Mar. 9, 1971
[73] Assignee Amerace Esna Corporation
New York, N.Y.

[54] SELF-LOCKING THREADED FASTENER
19 Claims, 27 Drawing Figs.
[52] U.S. Cl. .................................................. 151/7,
117/128.4, 156/320, 156/330, 264/271
[51] Int. Cl. .................................................. F16b 39/34
[50] Field of Search .................................................. 151/7, 14.5;
85/1 (C); 10/10, 86 (A); 264/271, 274, 269, 267;
117/128.4, 75, 37 (LX), 161 (P), 97; 156/330,
293, 320—22; 285/(Mastic Digest)

[56] References Cited
UNITED STATES PATENTS
| 2,939,805 | 6/1960 | Johnson | 85/1C |
| 2,989,107 | 6/1961 | James et al. | 151/7 |
| 3,002,770 | 10/1961 | Chestnut et al. | 85/1C |
| 3,061,455 | 10/1962 | Anthony | 151/7 |
| 3,093,177 | 6/1963 | Villo | 151/7 |
| 3,264,131 | 8/1966 | Nagel | 117/75 |
| 3,294,139 | 12/1966 | Preziosi | 151/7 |

Primary Examiner—Ramon S. Britts
Attorney—Prangley, Clayton, Mullin, Dithmar and Vogel ABSTRACT: A reusable self-locking threaded fastener is provided having a patch of nylon or like thermoplastic material bonded to several convolutions of the unmodified thread surfaces and gradually merging at its boundary edge portions into the thread surfaces, the nylon patch being melted and fused and solidified without work-shaping pressures and containing from about 0.1 percent to about 5 percent by weight of molybdenum disulfide; a reusable self-sealing and self-locking fastener is provided in which the unmodified nylon patch has a circumferential extent of about 200° to about 300°; by adding to the nylon patch molybdenum disulfide the circumferential extent may be 360°; a method of forming the self-sealing and self-locking fasteners is provided wherein the heated fastener has the nylon in powdered form, and if desired the molybdenum disulfide mixed therein, dropped thereonto while the fastener rotates about its longitudinal axis to melt and hold a quantity of the nylon thereon, after which the fastener may be heated to the fusion temperature of the nylon to further melt the patch; further a primer coating of epoxy resin is provided between the patch and the fastener; the resultant fastener can be reused a minumum of five times and still retain the desired self-locking and self-sealing characteristics thereof.

PATENTED MAR 9 1971 3,568,746

Inventors
CHARLES C. FARONI
JOHN S. HUMPHREY, JR.

By
Brangley, Baird, Clayton, Miller & Vogel.
Attys.

SELF-LOCKING THREADED FASTENER

The present invention is directed to reusable self-locking threaded fasteners, and particularly to such fasteners that are also self-sealing in character, and to methods of making the same, and is an improvement on the fasteners and methods disclosed in U.S. S. Pat. No. 3,294,139 granted Dec. 27, 1966 to Joseph R. Preziozi.

It is an important object of the present invention to provide an improved reusable self-locking threaded fastener wherein the self-locking characteristic is provided a method for making by a patch of solid thermoplastic material bonded to a plurality of convolutions of the unmodified thread surfaces, the fastener being capable of many applications and removals without losing the self-locking characteristics thereof.

In connection with the foregoing object, it is another object of the invention to provide a method for making a self-locking threaded fastener of the type set forth wherein the patch is formed of thermoplastic material melted and fused and solidified without work-shaping pressures, the thermoplastic material containing from about 0.1 percent by weight to about 5 percent by weight of molybdenum disulfide.

Another object of the invention is to provide a method for making a self-locking threaded fastener of the type set forth wherein a primer coating of synthetic organic resin material is disposed between the surface of the thread and the patch to provide improved adherence therebetween, the preferred resin material being an epoxy resin.

Yet another object of the invention is to provide a method for making a self-locking fastener of the type set forth which is also self-sealing, the patch having a circumferential extent in the range of from about 200° to about 300°, a primer coating of a resin material such as an epoxy resin preferably being provided between the patch and the fastener.

In connection with the foregoing object, another object of the invention is to provide a method for making a self-locking and self-sealing fastener that is externally threaded and is provided with a patch of thermoplastic material having a circumferential extent of at least about 200°, the thermoplastic material containing from about 0.1 percent by weight to about 5 percent by weight of molybdenum disulfide, such fasteners being capable of having 360° circumferential extent of the patch without loss of the patch during the application of the fastener in its intended use.

A further object of the invention is to provide an improved method of making reusable self-locking and self-sealing screws of the type set forth, the method including the steps of heating the screw to a temperature above the melting temperature of the thermoplastic material used as a patch thereon, depositing upon a selected area the thread of the heated screw a quantity of the thermoplastic material in fine powdered form while rotating the screw around its longitudinal axis, at least a portion of the thermoplastic material being melted by the heat of the screw and adhering thereto and to the thermoplastic material, and thereafter cooling the thermoplastic material to a temperature below the flow point thereof to provide a unitary cohesive body of solid thermoplastic material bonded to the thread.

Further features of the invention pertain to the steps of the methods whereby the above-outlined and additional operating features thereof are attained.

The invention, both as to its organization and method of operation, together with further objects and advantages thereof, will best be understood by reference to the following specification taken in connection with the accompanying drawings, in which:

Figure 1:
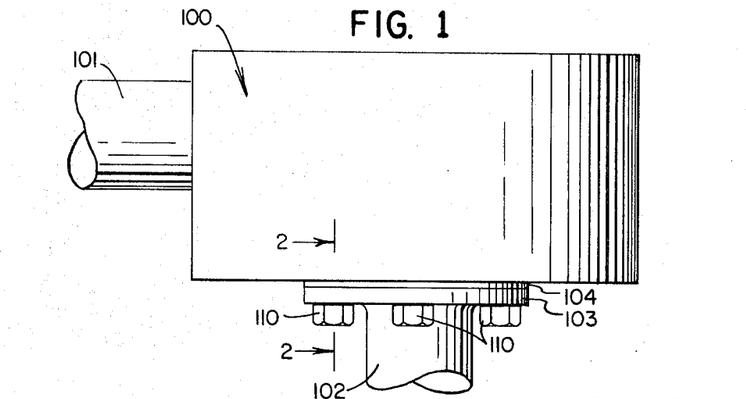
FIG. 1 is a front elevational view of a pressure apparatus incorporating therein a self-locking and self-sealing screw made in accordance with and embodying the principles of the present invention.

There is illustrated in FIG. 1 of the drawings a pressure vessel 100 in which the improved screw 110 of the present invention is particularly useful, the screw 110 being both self-locking and self-sealing in character and also reusable. The pressure vessel 100 more specifically includes an inlet pipe 101 and an outlet pipe 102, the outlet pipe 102 having an outwardly directed flange 103 which bears against a gasket 104 disposed between the flange 103 and the vessel 100, a plurality of the improved screws 110 being provided to connect the flange 103 to the vessel 100. More specifically, each screw 110 extends through aligned openings 105 and 106 in the flange 103 and the gasket 104, respectively, and into a threaded opening 107 in the vessel 100, the threaded opening 107 communicating with the interior of the vessel 100, and therefore being exposed to the pressures therein. Not only must the screws 110 hold the flange 103 in the operative position, but the screws 110 in accordance with the present invention actually seal the threaded openings 107 in the vessel 100 that receive the shanks of the screws 110.

Referring now more particularly to FIGS. 3 to 8 of the drawings, the details of construction of one of the screws 110 will be described. The screw 110 includes an elongated shank 111 provided at one end thereof with an enlarged head 112 that provides engagement surfaces for a tool. Formed along the greater portion of the length of the shank 111 is a continuous helical thread 113, the thread 113 being of standard form and shape as illustrated in the drawings. Disposed upon and covering the entire outer surface of the screw 110 is a coating of primer material, preferably an epoxy resin, and disposed on a portion of the threads 113 is a patch 120 of thermoplastic material formed without application of work-shaping or molding pressures. The patch 120 more specifically is a resiliently deformable plastic patch of limited axial extent and substantial circumferential extent. As illustrated, the patch 120 covers approximately five convolutions of the thread 113 out of a total of approximately twelve convolutions, and referring to FIG. 8, it will be seen that the circumferential extent of the patch 120 at its point of greatest circumferential extent is approximately 270°; more particularly, the patch 120 has a pair of ends 121 that are generally rounded in shape and a pair of sides 122 that extend circumferentially around the greater portion of the diameter of the associated convolutions of the thread 113. The boundary edge portions of the patch 120 gradually merge into the surfaces of an associated convolution of the thread 113, and in particular the end edges 123 associated with the ends 121 merge into the associated surfaces of the convolutions of the thread 113 as do the side edges 124 associated with the sides 122. Finally, the inner surface 128 of the patch 120 conforms generally to the outer surface of the thread 113 in the associated area thereof and is tightly bonded thereto, the epoxy coating 115 assisting in this bond, and the outer surface 129 of the patch 120 only roughly corresponds to the shape of the associated convolutions of the thread 113, see FIGS. 4 and 5, for example.

In order to reduce the stripping and shearing components of the forces exerted by the thread of a mating threaded opening during the insertion of the screw 110 thereinto, and in order to provide the desired initial locking torque, as well as to provide satisfactory locking torques over a number of reuses of the screw 110, the thickness and configuration of the plastic patch 120 is that illustrated in the drawings, FIGS. 2 to 8. The main portion of the patch 120 has a generally uniform thickness, chosen for the primary purpose of obtaining the desired final locking torque. The thickness of the plastic patch gradually diminishes circumferentially from the main body portion to the longitudinally boundary edges 123 and also gradually diminishes longitudinally to the boundary edges 124. Thus the boundary edges 123 and 124 will be the first parts of the plastic patch 120 to engage a complementary internal thread as the screw 110 is moved into the engaged position. The gradual increase in the thickness of the plastic patch throughout the edge portions 123 and 124, and in the thread tightening direction, serves to effect a gradual engagement of the plastic patch 120 with the oncoming complementary thread such as the thread 108 about the opening 107 in the vessel 100, and gradually builds up the deforming forces to a maximum at the main body portion of the patch 120.

Since the forces, or components thereof, which tend to peel the plastic patch 120 from the thread 113 are those extending in the direction of rotation of the screw when tightening the same, the gradual engagement of the oncoming internal thread 108 assures a gradual deformation of the patch 120 and a gradual increase in the deforming forces applied to the patch 120 so as to build up to a maximum as the thickness of the plastic patch 120 increases, and the maximum forces are applied to a location remote from the edges 123 and 124 of the patch 120 and are ineffectual to effect a peeling of the patch.

The plastic patch 120 is deformable when the normal screw tightening pressures are applied thereto and serves to mate against the associated thread 108 and completely to seal the space between the thread 108 and the thread 113, the deformation of the patch 120 being fundamentally responsible for providing the complete sealing between the threads 108 and 113 despite the fact that the patch 120 has a circumferential extent of only 270°.

The plastic patch 120 is, as shown, a unitary cohesive body with its inner metal contacting surface 128 contiguous with the thread defining surfaces of the thread 113 from the root surfaces thereof to and over the crest surfaces thereof. It is noted that the longitudinal boundary edges of the sides 122 taper longitudinally from a central portion of greater angular or circumferential extent to the edges 124. This longitudinal tapering of the body 120 further enhances the gradual buildup of the plastic deforming forces, thereby precluding peeling of the patch 120 from the thread 113. Thus the deforming forces are spread over greater longitudinal and circumferential distances to increase the area of the unitary plastic patch 120 over which such forces act and to decrease the concentration of the building forces which tend to tear the plastic patch 120 from the screw thread 113.

It should be noted that the leading edge 122 of the plastic patch 120 terminates at a point spaced from the leading end of the screw thread 113 by a distance of at least one full thread convolution to assure proper mating with an associated internal thread prior to the engagement of the latter with the plastic patch 120. The advantages of a gradual engagement between the plastic patch 120 and the associated internal thread of a mating element are further realized by decreasing the thickness or depth of the plastic patch 120 from a maximum at the central portion to a minimum at the ends 121 and the sides 122, see FIGS. 4 through 8.

Figure 2:
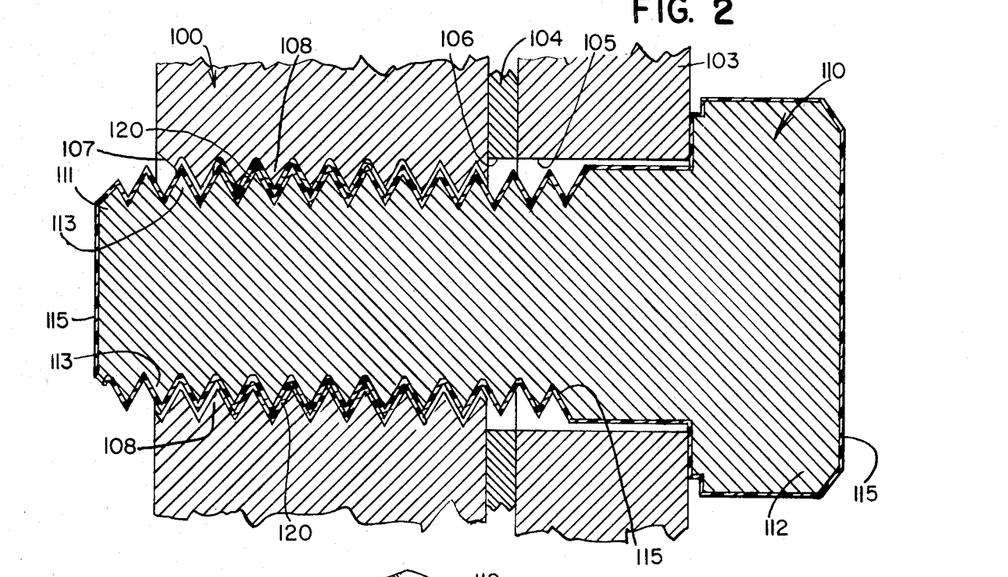
FIG. 2 is an enlarged view in vertical section through the apparatus of FIG. 1 along the line 2–2 thereof and further illustrating the screw of the present invention.
Figure 3:
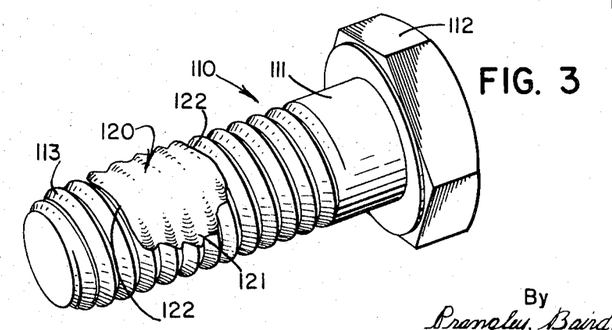
FIG. 3 is a perspective view of the self-locking and self-sealing screw of the present invention illustrated in FIGS. 1 and 2.
Figure 4:
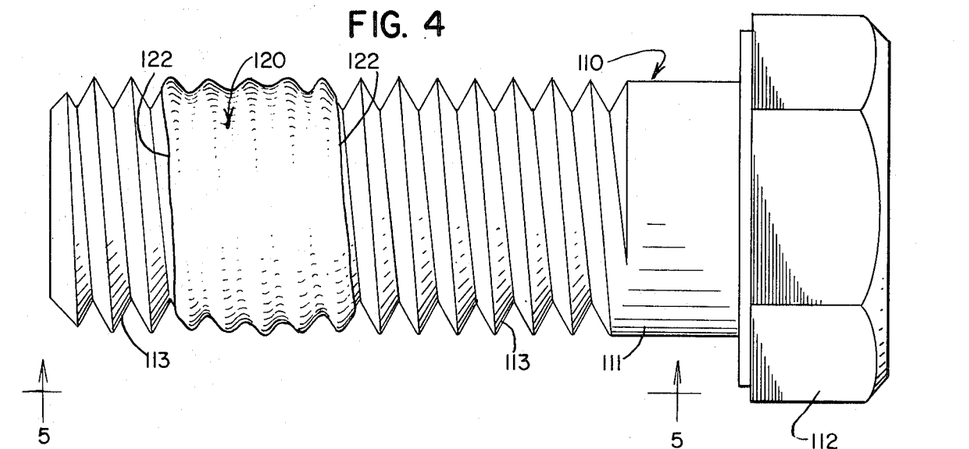
FIG. 4 is a plan view on an enlarged scale of the screw of FIG. 3.
Figure 5:
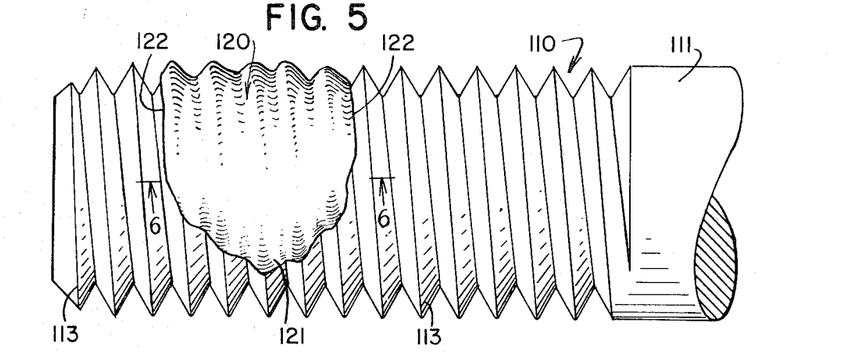
FIG. 5 is a partial side elevational view along the lines 5–5 of FIG. 4.
Figures 6, 7, 8:
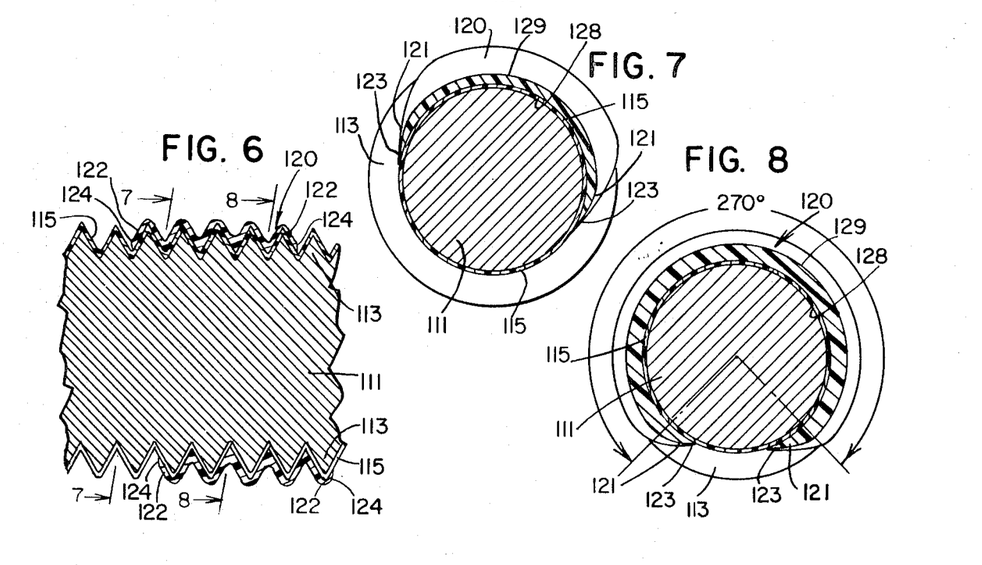
FIG. 6 is a fragmentary longitudinal cross-sectional view along the line 6–6 of FIG. 5.
FIG. 7 is a transverse cross-sectional view along the line 7–7 of FIG. 6.
FIG. 8 is a transverse cross-sectional view along the line 8–8 of FIG. 6.

In accordance with the present invention, the patch 120 must provide both laterally directed wedging forces to lock the screw with respect to the thread of a mating element and sealing forces to seal the space between the thread 113 and the associated thread, such as thread 108 in FIG. 2, the resultant seal serving to prevent both flow along the helical thread path and an axial type of cascade flow along those portions of the thread 113 not carrying a portion of the patch 120. The patch 120 will be both self-locking and self-sealing as described above if it has an appreciable longitudinal extent and a circumferential extent in the range from about 200° to about 300°. It has been found that the patch 120 is deformed circumferentially during engagement with a mating threaded element to provide a good seal against liquids, such as oil and water, and against gases, such as air; the seal is provided whether or not the screw 110 is seated or loaded.

The assembly shown in FIG. 2 wherein the plastic patch 120 has a circumferential extent of 270° (see FIG. 8) seals tightly with no leaks against a pressure of 100 p.s.i. of air even when the entire assembly is at 212° F. If the circumferential extent of the plastic patch 120 is less than 200°, the plastic patch 120 provides satisfactory locking action but does not seal against axial flow of liquids and gases. If the circumferential extent of the plastic patch is greater than 300°, the shear or frictional drag forces exerted by the mating threads, such as the mating threads 108 in FIG. 2, serve to tear and rip and irregularly distort the plastic patch 120 because there is no available space into which the material of the plastic patch 120 can flow under load. As a result, the locking torque is very high for the first use of the screw, and the first removal of the screw from the mating element tears the plastic patch 120 from the thread 113, thus rendering the screw unfit for reuse.

The plastic patch 120 may be readily formed in the configuration described by depositing the plastic material in the form of a fine powder which is subsequently melted and cooled to produce, by the action of gravity and as determined by the surface tension of the melted plastic, a continuous, integral, cohesive patch of plastic material adhered to the thread defining surfaces of the screw. The configuration of the patch is controlled by controlling the distribution, or depositing, of the plastic powder over the screw thread.

Figure 9:
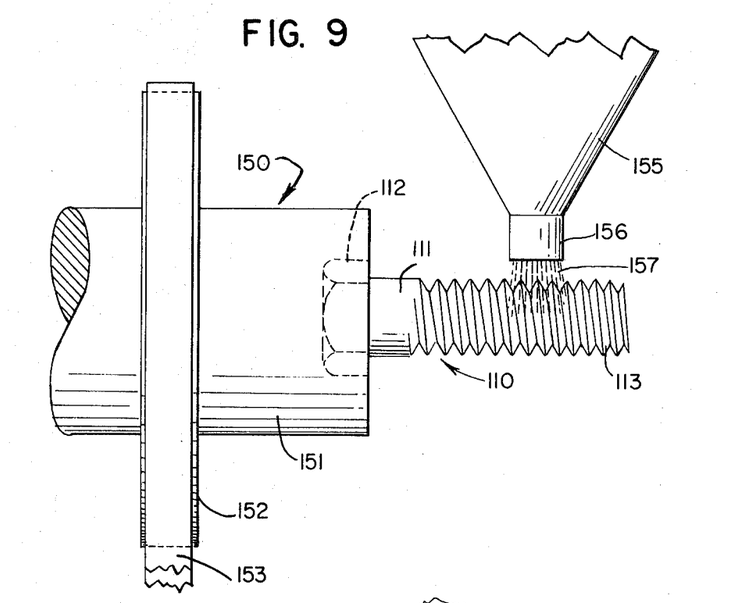
FIGS. 9 and 10 are schematic representations of the method and apparatus for making the screw of FIGS. 1 to 8, inclusive.
Figure 10:
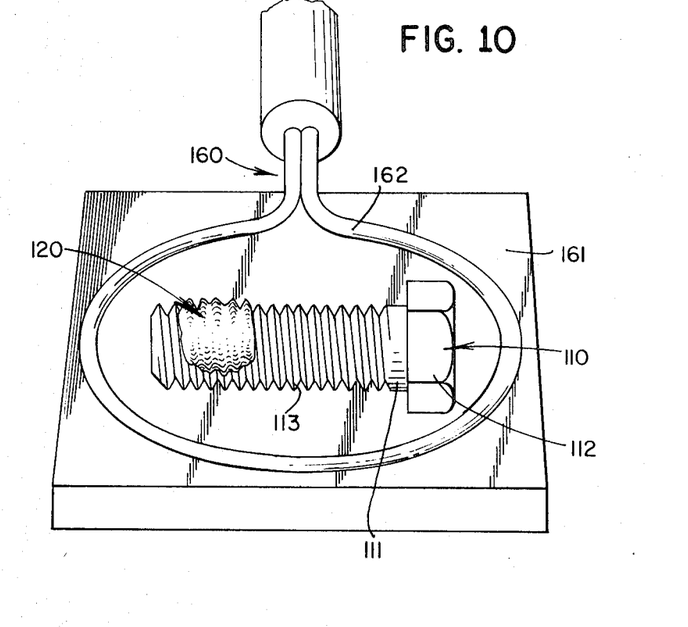

FIGS. 9 and 10 schematically illustrate the improved method and apparatus of the present invention for depositing fine plastic powder over a limited area of the screw thread surface. Referring to FIG. 9, the resin or plastic applying apparatus 150 includes a screw holder 151 arranged to receive and to hold the head 112 of a screw 110 with the longitudinal axis of the screw 110 disposed substantially horizontal. The holder 151 is further mounted (by means not shown) to rotate about an axis coaxial with the longitudinal axis of the screw 110, a pulley 152 and a driving belt 153 therefor being provided for the holder 151 to cause rotation thereof as described. As a result, the screw 110 can be rotated about its longitudinal axis by means of the holder 151 engaging the head 112 only, and while the longitudinal axis of the screw 110 is disposed generally horizontal.

Disposed above the thread 113 on the screw 110 positioned in the holder 151 is a hopper 155 for the powdered plastic, the hopper 155 being generally in the form of an inverted cone having an annular outlet 156 disposed above an in alignment with a predetermined portion of the thread 113 to direct a stream 157 of powdered plastic thereon. The shape of the outlet 156, assures that maximum amounts of the powdered plastic are deposited in the center of the area of the thread 113 therebelow and lesser amounts on the edges of the area of the thread 113 therebelow.

In accordance with one form of the present method, the screw is dipped in, or otherwise treated with, a weak acid solution to clean the thread surfaces and if necessary slightly to roughen the same. The cleaned screw is then heated to a temperature in the range from about 500° F. to about 550° F., a preferred temperature being 525° F, and immediately thereafter mounted in the holder 151 and the powdered plastic applied thereto. In a second form of the present method, the cleaned screw has a primer coat of resin, the preferred resin being an epoxy resin, applied thereto before heating to 525° F., all as will be explained more fully hereinafter.

In a preferred example of the present method, the powdered plastic is powdered nylon 11 having a particle size to all pass through an 80 per inch mesh screen, or finer. The nylon 11 powder is placed in the hopper 155 and applied through the outlet 156 to the screw 110 heated to a temperature of 525° F., the nylon 11 powder being at room temperature and falling under the influence of gravity upon the selected area of the heated thread 113 while the screw 110 is rotated through a predetermined angle so as to apply nylon 11 to 270° of the circumferential extent thereof. As the powdered nylon 11 strikes the heated thread 113, a portion of the nylon 11 is melted and sticks to the surfaces of the thread 113, and then additional nylon 11 adheres to the melted layer thereof on the thread 113 until the desired amount of nylon 11 is adhered to the thread 113 on the screw 110. It is pointed out that at this time the nylon 11 is not a cohesive single mass.

The screw 110 with the nylon 11 adhered thereto is then transferred to a fusing apparatus 160, see FIG. 10, and specifically to a support plate 161 thereof and within the field of a high frequency induction heating coil 162. The induction heating coil 162, in a predetermined short time, brings the screw to a temperature sufficient to melt the nylon 11 after which the induction heating coil 162 is shut off. The nylon 11 will, when heated to its melting temperature, more or less readily flow longitudinally and circumferentially of the thread under the action of gravity to wet and to form a most intimate contact with the thread defining surfaces of the screw and will flow into any depressions in those surfaces. The melted plastic is of relatively low viscosity, as compared with plastics generally, but on cooling hardens into a coherent unitary body or plastic patch 120 extending over the crests of a predetermined number of thread convolutions.

The nylon 11 used to form the plastic patch 120 as described above, provides initial and reuse torques well within the values necessary to qualify the screw 110 as a reusable self-locking screw. The nylon 11 also provides good sealing under use and reuse conditions to qualify the screw 110 as a reusable self-sealing screw. In fact the screw 120 may be reused five or more times and still provide satisfactory self-locking and self-sealing characteristics. The nylon 11 more particularly has an inherent tendency to return to its original form after removal of the screw 110 from the associated threaded member, this property being sometimes referred to as "plastic memory" or "elastic memory," this property permitting a substantial number of reuses of the screw 110.

Other plastics may be used in place of nylon 11 but it is desirable that such other plastics have a number of properties and characteristics comparable with or similar to nylon 11, in addition to "elastic memory." Thus, at its melting point the plastic should have a viscosity of the order of nylon 11 and should preferably exhibit good wetting properties when in contact with metals and other surfaces. Other properties which need to be taken into consideration are relatively low moisture absorption, high resistance to abrasion, great resistance to common chemicals, high relative hardness, high strength, toughness and resiliency, and low coefficient of friction. Since for many uses, the plastic materials will be exposed to temperatures as high as 250° F., it is desirable that for general purpose uses the plastic be mechanically and chemically resistant to prolonged exposure at temperatures above 250° F.

Other considerations which enter into the selection of a plastic to be employed in accordance with the teaching of this invention are concerned, to a considerable extent, with properties facilitating manufacture of the patch type fastener. In this connection, it is desirable that the plastic be available in fine powdered form or reducible thereto, i.e., to a particle size such that all will pass an 80 mesh screen, a large portion of the material passing a 200 mesh screen. It is also desirable that the plastic be capable of adhering directly to the material of the fastener or to another surface coating thereon with a firm bond and require no more than simple and inexpensive preparation of the metal thread surfaces to obtain such firm bond. It is also desirable that the material have a melting point or flow point which is well below the temperature at which it begins to degrade or decompose so that complex or expensive heating controls need not be required.

By way of example and illustration, other linear polyamide resins such as nylon 6, nylon 6/6, nylon 6/10 and nylon 8 have properties as outlined above which are fairly comparable with those of nylon 11. Certain of the vinyl resins, including particularly certain vinyl chloride vinyl acetate copolymers, also possess the above described properties to an adequate degree and can be used where exposure to organic solvents would not likely be encountered. FEP fluorocarbon, a copolymer of tetrafluoroethylene and hexafluoro-propylene, possesses the above-described properties comparable, and in some instances superior to nylon 11 and may also be used for general purpose uses. Polypropylene resins possess many of the above described properties, in comparable degree to nylon 11, and may be used where exposure to organic solvents at temperatures above 176° F. is not likely to be encountered.

As has been pointed out above, in a second preferred method of the present invention, a primer coat 115 of epoxy resin, or other suitable resin such as a phenolic resin, is applied to the surfaces of the screw 110 prior to the application of the plastic patch 120 thereto. The epoxy resin utilized is a mixture in the ratio 5:2 of an epoxy resin sold under the trademark "Epon" and designated as resin 1007–CT–and an epoxy resin sold under the trademark "Beetle 227–8." The mixture of epoxy resins is dissolved and diluted in the solvent mixture containing by volume one part xylol and three parts diacetone alcohol at the ratio of five parts of solvent to one part of resin concentrate. All surfaces of the screw 110 are rendered clean, dry and free from grease, oil and other foreign matter prior to the application of the epoxy resin resolution thereto. The resin solution is applied by dipping or other suitable method at room temperature with sufficient agitation so that all surfaces of the screw 110 are exposed to the solution. After the application of the resin solution, the screw 110 is removed therefrom and excess solution allowed to drain off and then the screw 110 is centrifuged. The coated screw 110 is then baked at 425° F. for ten minutes to cure the epoxy resin. The resultant epoxy coating has a thickness on the order of about 0.01 mil. It is believed that the epoxy coating provides for increased and enhanced adherence between the surfaces of the thread 113 on the screw 110 and the plastic patch 120.

Figure 11:
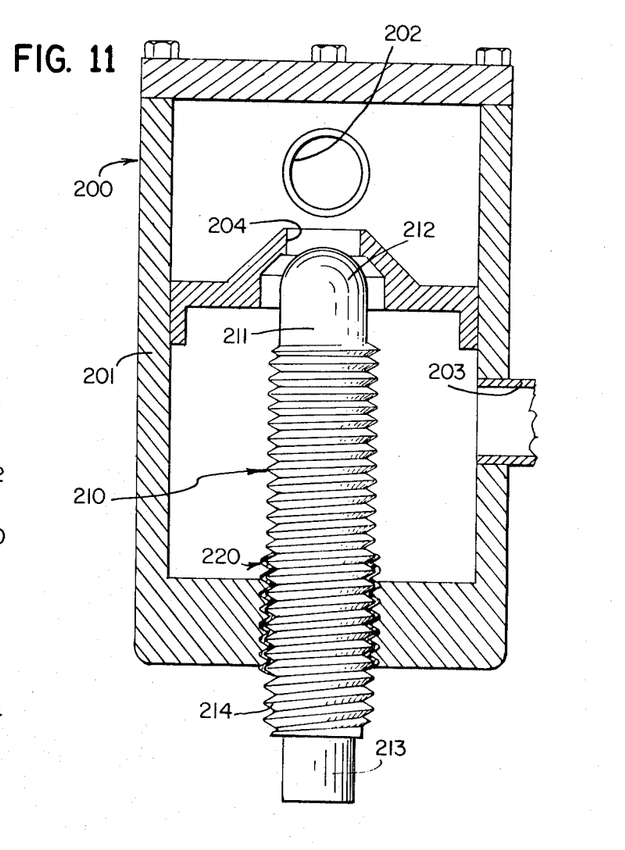
FIG. 11 is a view in vertical section through a valve incorporating therein a second form of threaded fastener made in accordance with and embodying the principles of the present invention.
Figure 12:
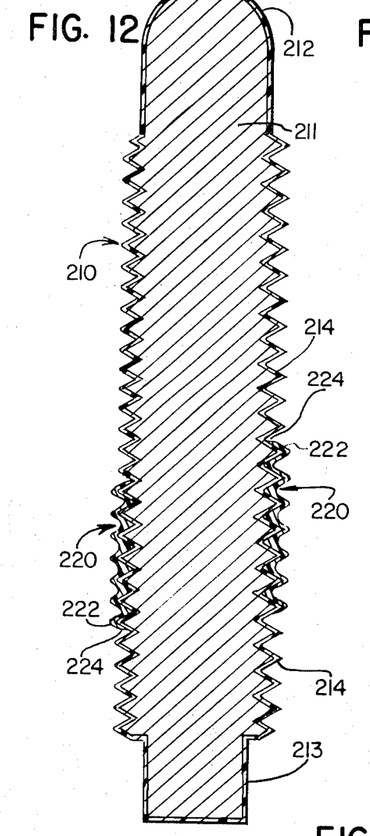
FIG. 12 is a view in longitudinal section through the fastener of FIG. 11 along the line 12–12 of FIG. 13.
Figure 13:
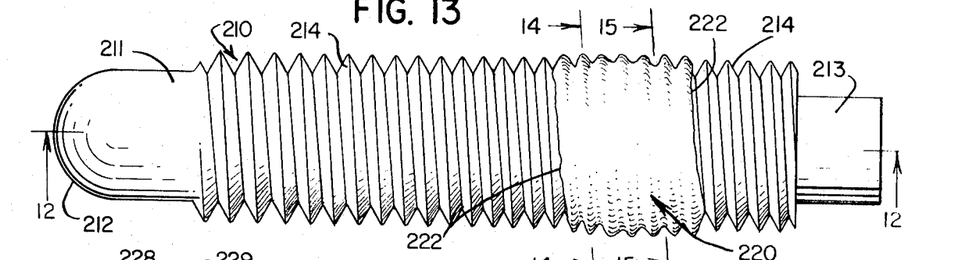
FIG. 13 is an elevational view of the fastener of FIG. 11 on a slightly enlarged scale.
Figures 14, 15:
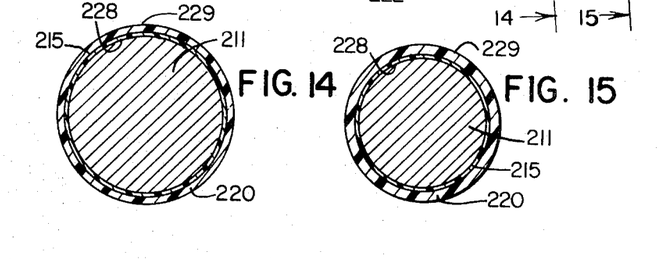
FIG. 14 is a view in transverse cross section along the line 14–14 of FIG. 13.
FIG. 15 is a view in transverse cross section along the line 15–15 of FIG. 13.
Figures 16, 17:
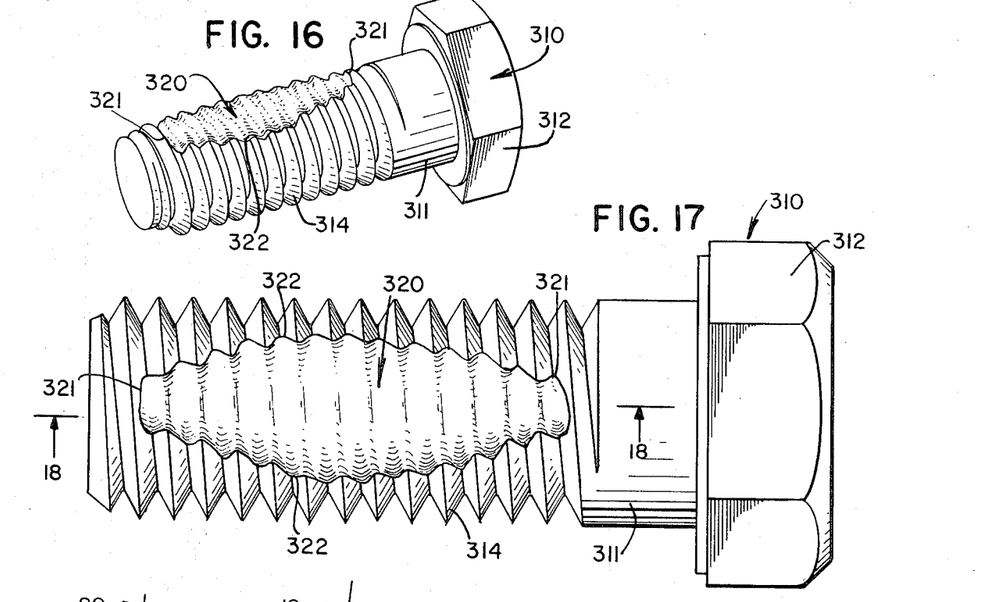
FIG. 16 is a perspective view of a third embodiment of a threaded fastener made in accordance with and embodying the principles of the present invention.
FIG. 17 is a plan view on an enlarged scale of the fastener of FIG. 16.
Figure 18:
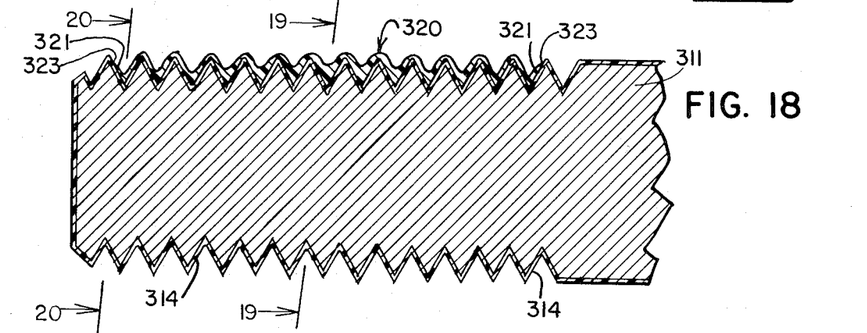
FIG. 18 is a fragmentary cross-sectional view along the lines 18–18 of FIG. 17.
Figure 19:
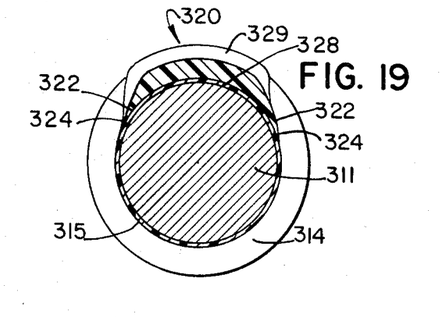
FIG. 19 is a transverse cross-sectional view along the lines 19–19 of FIG. 18.
Figure 20:
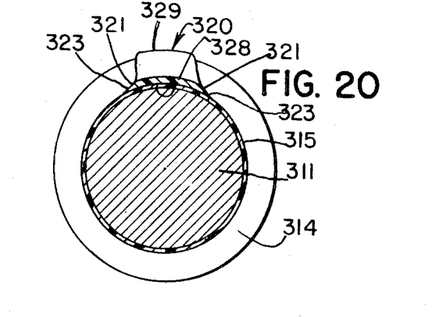
FIG. 20 is a transverse cross-sectional view along the line 20–20 of FIG. 18.
Figure 21:
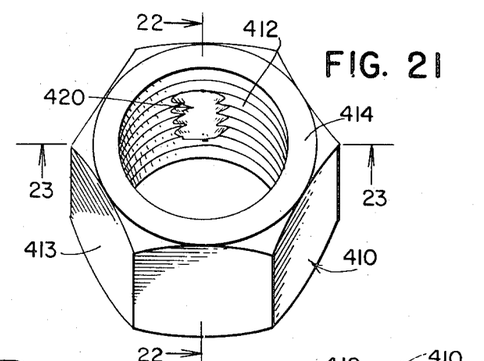
FIG. 21 is a perspective view of a fourth embodiment of a threaded fastener in the form of a nut made in accordance with and embodying the principles of the present invention.
Figure 22:
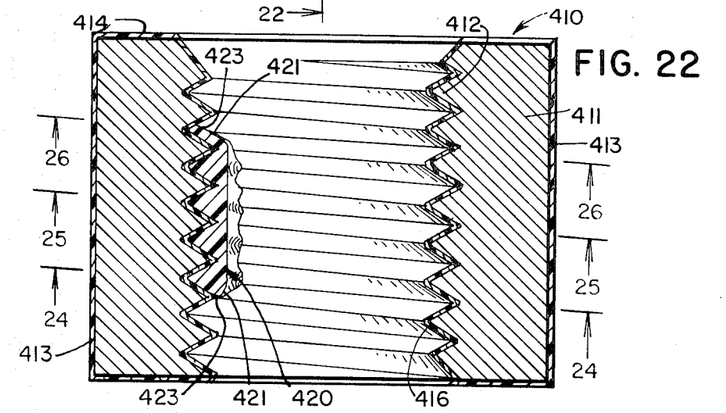
FIG. 22 is a longitudinal cross section on an enlarged scale along the line 22–22 of FIG. 21.
Figure 23:
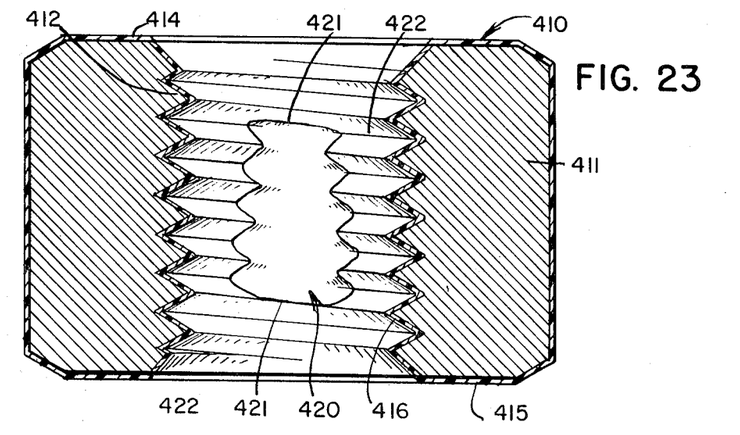
FIG. 23 is a longitudinal cross section on an enlarged scale along the line 23–23 of FIG. 21.
Figure 24:
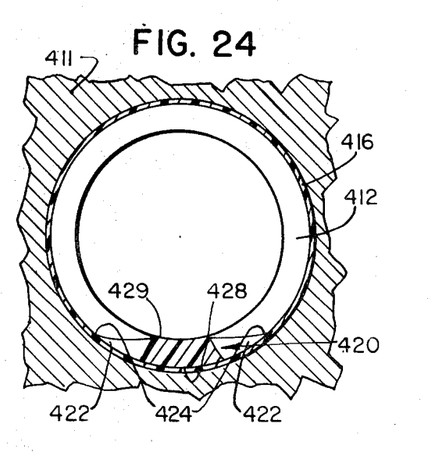
FIG. 24 is a partial transverse cross section along the line 24–24 of FIG. 22.
Figure 25:
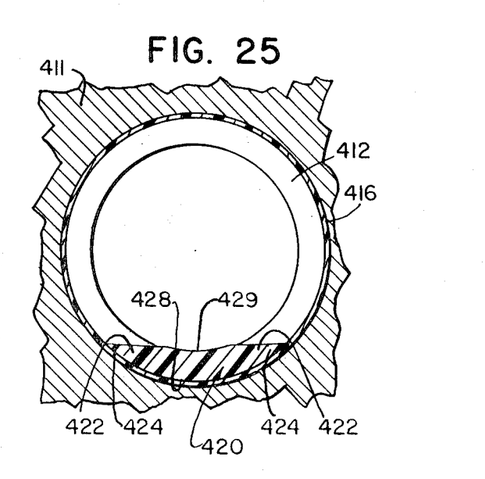
FIG. 25 is a fragmentary transverse cross section along the line 25–25 of FIG. 22.
Figure 26:
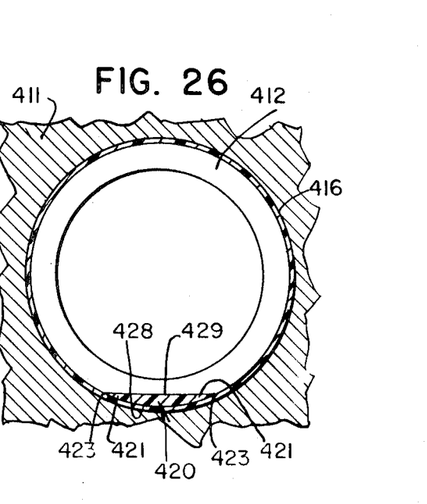
FIG. 26 is a fragmentary transverse cross section along the line 26–26 of FIG. 22.

There is illustrated in FIGS. 11 to 15 of the drawings a second embodiment of a screw made in accordance with the present invention, the screw being illustrated in FIG. 11 of the drawings positioned in a valve 200, the screw being designated 210 and being of the type that is both self-locking and self-sealing, and further is reusable. The valve 200 more particularly includes a valve body 201 provided with an inlet 202 and an outlet 203 with a valve seat 204 disposed therebetween. The screw 210 includes a shank 211 having on one end thereof a rounded closure portion 212 that cooperates with the valve seat 204 to restrict the flow of material from the inlet 202 to the outlet 203. The other end of the screw 210 carries a tool engaging portion 213 and the portion of the shank 211 disposed between the portions 212 and 213 has a thread 214 thereon. Preferably the screw 210 has an epoxy coating 215 completely covering all surfaces thereof, the epoxy coating 215 being of the same composition and character as the epoxy coating 115 described above with respect to the screw 110.

A number of convolutions of the thread 214 carry thereon a plastic patch 220 extending completely therearound, the plastic patch 220 being a thermoplastic material formed without the application of any work-shaping forces thereto. The patch 220 as illustrated covers approximately seven convolutions of the thread 214, roughly one-quarter of the total length of the thread 214 and has a pair of circumferentially extending sides 222 having side edges 224. The boundary edge portions of the patch 220 gradually merge into the surfaces of the associated convolution of the thread 214, and in particular the side edges 224 associated with the sides 222 merge into the associated surfaces of the convolutions of the thread 214. The inner surface 228 of the patch 220 conforms essentially to the outer surface of the thread 214 in the associated area thereof and is tightly bonded thereto, the epoxy coating 215 assisting in this bond, and the outer surface 229 of the patch 220 only roughly corresponds to the shape of the associated convolutions of the thread 214, see FIGS. 12 and 13, for example.

Furthermore, the side edges 224, and specifically the side edge 224 disposed toward the closure portion 212, tapers from a greater thickness toward the center of the plastic patch 220 to a very narrow thickness, thereby to reduce the stripping and shearing forces exerted by a thread of a mating threaded member during the insertion of the screw 210 thereinto. In order to provide the desired initial locking torque, as well as to provide satisfactory locking torques over a number of reuses of the screw 210, the thickness and configuration of the plastic patch 220 is that illustrated in the drawings, FIGS. 11 to 15. In general the plastic patch 220 has the configuration of the plastic patch 120 described above, and differs fundamentally in that the circumferential extent of the plastic patch 220 is a full 360°.

In order to permit the plastic patch 220 to have a full 360° circumferential extent and still to preserve reasonable torque characteristics and reuse characteristics, as well as self-sealing characteristics, the plastic material forming the plastic patch 220 has been modified by adding thereto a quantity of molybdenum disulfide. More specifically, in one preferred example of the present invention, nylon 11 of the same character described above with respect to FIGS. 1 to 10, is provided in powdered form. There is added to the powdered nylon 11 one percent of molybdenum disulfide having an average particle size less than about 1 micron. The powdered nylon 11 and the powdered molybdenum disulfide are mixed in a barrel tumbler for three hours, and the mixture thereafter applied to a heated screw 210 utilizing the apparatus and method illustrated in FIG. 10.

The function of the molybdenum disulfide in the completed patch 220 is not fully understood; however, it has been found that by adding the molybdenum disulfide in the amounts noted to the plastic patch, a full 360° patch 220 may be utilized, thereby to insure that the screw 210 is fully self-sealing. It is believed that the molybdenum disulfide acts in the nature of a filler in the plastic material and slightly raises the modulus of elasticity thereof, and thus modifies the recoverability of the patch upon removal after use. The molybdenum disulfide is also believed to act as a nucleating agent, i.e., it permits the onset of crystallization throughout the entire plastic body substantially simultaneously and thereby prevents the growth of large spherulites from isolated nuclei, thus tending to increase the crystalinity of the patch 220 and also the stiffness and elastic recoverability thereof. The molybdenum disulfide also may lower the overall coefficient expansion of the patch and thus provides increased dimensional stability thereof. Finally, it is believed that the molybdenum disulfide acts as a surface lubricant, the molybdenum disulfide tending to rise to the outer surface 229 of the plastic patch 220 and thus to provide lubricating action in the most effective place, thus considerably reducing the tear forces applied to the plastic patch 220.

In any event, the addition from about 0.1 percent to about 5 percent of molybdenum disulfide to the plastic material permits the plastic patch 220 to have a circumferential extent of a full 360° while preserving both the self-locking and self-sealing characteristics thereof, even after five reuses, which structure would be entirely unsuitable for reuse in the absence of molybdenum disulfide. In this regard it is noted that if more than about 5 percent of molybdenum disulfide is added to the plastic material, the resultant plastic patch 220 is materially weakened so that tearing thereof is experienced upon reuse, and there also is a substantial loss of cohesion of the plastic patch 220. If further is pointed out that any of the other plastic materials described above with respect to the plastic patch 120 may be substituted for the nylon 11 when forming the plastic patch 220.

There is illustrated in FIGS. 16 to 20 of the drawings a third embodiment of the invention in the form of a screw 310 having a plastic patch 320 thereon, the screw 310 and the plastic patch 320 being of the same shape and configuration as the screw and associated plastic patch disclosed in the above-mentioned U.S. Pat. No. 3,294,139. The screw 310 is also the type that is both self-locking and self-sealing, and further is reusable, the screw 310 including a shank 311 having on one end thereof a wrench-engaging head 312 and having formed on the shank 311 a thread 314 of standard configuration. Preferably the screw 310 has an epoxy coating 315 completely covering all of the surfaces thereof, the epoxy coating 315 having the same composition and character as the epoxy coating 115 described above with respect to the screw 110.

As has been stated above, the shape and form of the patch 320 is identical to that of the patch on the screw disclosed in U. S. Pat. No. 3,294,139, and more particularly includes a pair of narrow ends 321 and a pair of elongated sides 322 that are provided respectively with end edges 323 and side edges 324. The inner surface 328 of the patch 320 conforms essentially to the outer surface of the thread 314 in the associated area thereof and is tightly bonded thereto, the epoxy coating 315 assisting in this bond, and the outer surface 329 of the patch 320 only roughly corresponds to the shape of the associated convolutions of the thread 314.

The fundamental difference between the patch 320 and that disclosed in U. S. Pat. No. 3,294,139 resides in the composition of the plastic material of the patch 320, the composition of the patch 320 being nylon 11 with the molybdenum disulfide added thereto as described above with respect to the patch 220. It will be understood that the method of forming the patch 320 on the screw 310 may be the same as that disclosed in U.S. Pat. No. 3,294,139, there merely being a substitution of the mixture of nylon 11 and molybdenum disulfide for the plastic material disclosed in the patent. It has been found that the screw 310 with the modified patch 320 thereon has superior operating characteristics as compared to such a screw with a like patch that does not include the molybdenum disulfide addition.

There is illustrated in FIGS. 21 to 27 of the drawings a fourth embodiment of the invention in the form of a nut 410 having a plastic patch 420 thereon, the nut 410 being in the same shape and configuration as the nut disclosed in the above-mentioned U.S. Pat. No. 3,294,139, the nut 410 including a body 411 having an opening therein and carrying an internal thread 412, wrenching flats 413 and end surfaces 414 and 415. The entire nut 410 is covered by an epoxy coating 416 having the same composition and character as the epoxy coating 115 described above with respect to the screw 110.

A number of convolutions of the thread 412 carry thereon a plastic patch 420 of limited angular extent and limited longitudinal extent, the patch 420 having a pair of ends 421 and a pair of sides 422, the ends 421 being spaced at least one full thread convolution from the end surfaces 414 and 415, respectively. The patch 420 as illustrated covers approximately five convolutions of the thread 412, has a maximum arcuate or circumferential extent of approximately 90°, and is of the shape of a free-form liquid pool of thermoplastic material melted and fused and solidified without work-shaping pressures. The boundary edge portions of the patch 420 gradually merge into the surfaces of the associated convolutions of the thread 412, and in particular the ends 421 have associated end edges 423 that gradually merge into the surfaces of the associated convolution of the thread 412 and the sides 422 have side edges 424 that gradually merge into the surfaces of the associated convolutions of the thread 412. The inner surface 428 of the patch 420 conforms essentially to the outer surface of the thread 412 in the associated areas thereof and is tightly bonded thereto, the epoxy coating 416 assisting in this bond, and the outer surface 429 of the patch 420 only roughly corresponds to the shape of the associated convolutions of the thread 412.

Figure 27:
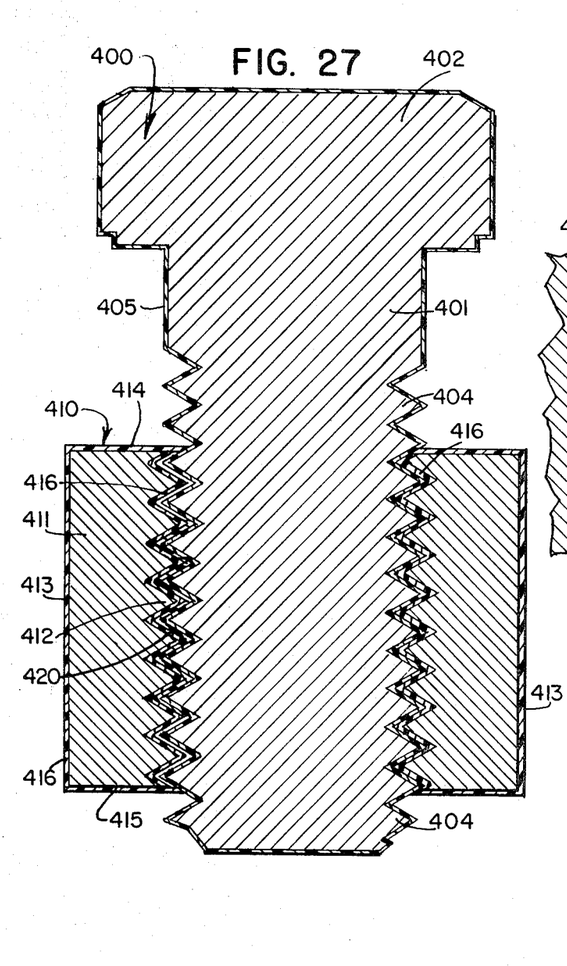
FIG. 27 is a view in longitudinal section illustrating an engagement between the nut of FIGS. 21 to 26 and an associated screw.

Furthermore, the side edges 424 taper from a greater thickness at the center of the plastic patch 420 to a very narrow thickness at the edge thereof, and the end edges 423 likewise taper from a greater thickness at the center of the plastic patch 420, to a very narrow thickness at the edge thereof, thereby to reduce the stripping and shearing forces exerted by the thread of a mating screw such as the screw 400 in FIG. 27 during the insertion of the screw 400 thereinto. As illustrated, the screw 400 includes a shank 401 carrying at one end a head 402 and having a thread 404 thereon shaped complementary to the thread 412, the entire screw 400 being illustrated as having an epoxy coating 405 thereon.

In order to provide the desired initial locking torque, as well as to provide satisfactory locking torques after a number of reuses of the nut 410, the thickness and configuration of the plastic patch 420 is that illustrated in the drawings in FIGS. 22 to 26. It will be understood that the nut 410 is self-locking, i.e., the patch 420 urges the cooperating convolutions of the threads 404 and 412 into locking engagement as illustrated in FIG. 27, but there is not necessarily any sealing between the screw 400 and the nut 410. In order to improve the desired characteristics of the nut 410, the plastic patch 420 has incorporated therein molybdenum disulfide in the same amount and for the same fundamental purposes as the patch 220 described above. It has been found that when the patch 420 has molybdenum disulfide added to the plastic material in the amount specified, there is a better balance of the frictional forces developed between the threads 404 and 412 so that an acceptable torque-tension relationship is achieved, as well as a locking torque within the prescribed limits. The addition of the molybdenum disulfide to the nylon 11 plastic material also seems to accentuate and enhance the abrasion resistance properties thereof. These characteristics are particularly desirable in the case wherein the threads 404 and 412 are in the fine series, the patch 420 maintaining the desired locking torque even after a number of reuses of the nut 410.

It is to be understood that changes may be made in the details and design of construction of the self-locking threaded fasteners and the methods of making the same as described herein without departing from the true spirit and scope of the invention as set forth in the appended claims.

We claim:

1. A self-locking threaded fastener wherein the self-locking characteristic is provided by a patch of solid thermoplastic material bonded to a plurality of convolutions of the unmodified surfaces of the thread and gradually merging at its boundary edge portions into such surfaces of the thread, said patch being formed of such thermoplastic material melted and fused and solidified without work-shaping pressures, said thermoplastic material containing from about 0.1 percent by weight to about 5 percent by weight of molybdenum disulfide.

2. The self-locking threaded fastener set forth in claim 1, wherein the patch is of the shape of a free-form liquid pool of the thermoplastic material adhered to the unmodified surfaces of the thread.

3. The self-locking threaded fastener set forth in claim 1, wherein the patch is of limited longitudinal extent to provide at least one uncoated full thread convolution between the patch and one end of the thread of the fastener.

4. The self-locking threaded fastener set forth in claim 1, wherein the thermoplastic material is selected from the class consisting of polyamide resins, vinyl chloride-vinyl acetate copolymer resins, polypropylene resins and copolymers of tetrachlorethylene and hexapropylene.

5. The self-locking threaded fastener set forth in claim 1, wherein the thermoplastic material is nylon 11.

6. The self-locking threaded fastener set forth in claim 1, wherein the thermoplastic material contains about 1 percent by weight of molybdenum disulfide.

7. The self-locking threaded fastener set forth in claim 1, wherein the molybdenum disulfide has a particle size less than about 1 micron.

8. The self-locking threaded fastener set forth in claim 1, wherein said fastener is externally threaded and the threads thereon are of standard form.

9. The self-locking threaded fastener set forth in claim 1, wherein said fastener is internally threaded and the thread is of standard form, and the plastic patch is of limited longitudinal extent to provide at least one uncoated full thread convolution between the patch and the end of the thread of the fastener.

10. A self-locking threaded fastener wherein the self-locking characteristic is provided by a patch of solid thermoplastic material bonded to a plurality of convolutions of the unmodified surfaces of the thread and gradually merging at its boundary edge portions into such surfaces of the thread, a primer coating of synthetic organic resin material disposed between the surfaces of the thread and said patch to provide good adherence therebetween, said patch being formed of such thermoplastic material melted and fused and solidified without work-shaping pressures, said thermoplastic material containing from about 0.1 percent by weight to about 5 percent by weight of molybdenum disulfide.

11. The self-locking threaded fastener set forth in claim 10, wherein said primer coating is essentially an epoxy resin.

12. The self-locking threaded fastener set forth in claim 11, wherein the primer coating of epoxy resin is cured by heating to a temperature in the range of from about 400° F. to about 500° F.

13. The self-locking threaded fastener set forth in claim 11, wherein the thickness of the primer coating is on the order of about 0.01 mil.

14. The self-locking threaded fastener set forth in claim 10, wherein said fastener is internally threaded and the patch is of the shape of a free-form liquid pool of the thermoplastic material.

15. An externally threaded self-locking and self-sealing fastener wherein the self-locking and self-sealing characteristics are provided by a patch of solid thermoplastic material bonded to a plurality of convolutions of the unmodified surfaces of the thread and gradually merging at its boundary edge portions into such surfaces of the thread, the circumferential extent of said patch being at least about 200° said patch being formed of such thermoplastic material melted and fused and solidified without such work-shaping pressures, said thermoplastic material containing from about 0.1 percent by weight to about 5 percent by weight of molybdenum disulfide.

16. The externally threaded self-locking and self-sealing fastener set forth in claim 15, wherein the thermoplastic material contains about 1 percent by weight of molybdenum disulfide having a particle size less than about 1 micron.

17. The externally threaded self-locking and self-sealing fastener set forth in claim 15, wherein the circumferential extent of said patch is 360°.

18. An externally threaded self-locking and self-sealing fastener wherein the self-locking and self-sealing characteristics are provided by a patch of solid thermoplastic material bonded to a plurality of convolutions of the unmodified surfaces of the thread and gradually merging at its boundary edge portions into such surfaces of the thread, the circumferential extent of said patch being at least about 200°, a primer coating of synthetic organic resin material disposed between the surfaces of the thread and said patch to provide good adherence therebetween, said patch being formed of such thermoplastic material melted and fused and solidified without work-shaping pressures, said thermoplastic material containing from about 0.1 percent by weight to about 5 percent by weight of molybdenum disulfide.

19. The externally threaded self-locking and self-sealing fastener set forth in claim 18, wherein said primer coating is essentially an epoxy resin.

UNITED STATES PATENT OFFICE
CERTIFICATE OF CORRECTION

Patent No. 3,568,746      Dated March 9, 1971

Inventor(s) Charles C. Faroni and John S. Humphrey

It is certified that error appears in the above-identified patent and that said Letters Patent are hereby corrected as shown below:

Col. 1, line 7, "U.S.S." should be -- U. S. --;
        line 8, "Preziozi" should be -- Preziosi --;
        line 9, after "provide" insert -- a method for mak
        lines 11 and 12, delete "a method for making".
Col. 2, line 31, after "fragmentary" insert -- longitudina
Col. 5, line 13, "an", second occurrence, should be -- and
Col. 6, line 59, "1007-CT-" should be -- 1007-CT-55 --;
        line 66, "resolution" should be -- solution --.
Col. 8, line 32, "If" should be -- It --.
Col. 10, line 73,      line 75, delete "such".

Signed and sealed this 31st day of August 1971.

(SEAL)
Attest:

EDWARD M. FLETCHER, JR.          ROBERT GOTTSCHALK
Attesting Officer               Acting Commissioner of Pa